United States Patent

Garito et al.

Patent Number: 5,318,448
Date of Patent: Jun. 7, 1994

[54] DEMONSTRATION MODEL FOR GYNECOLOGICAL PROCEDURE

[76] Inventors: Jon C. Garito, 264 Hedge La., Hewlett Harbor, N.Y. 11577; Alan G. Ellman, 1 Auerbach La., Lawrence, N.Y. 11516

[21] Appl. No.: 27,608

[22] Filed: Mar. 1, 1993

Related U.S. Application Data

[63] Continuation of Ser. No. 817,046, Jan. 6, 1992, abandoned.

[51] Int. Cl.⁵ .................................................. G09B 23/28
[52] U.S. Cl. .................................................. 434/273
[58] Field of Search ............... 434/262, 267, 272, 273; 128/3; 119/23; 604/349, 347, 346; 206/1.7, 214, 363, 370, 423; 211/69.1; 428/13, 34.1

[56] References Cited

U.S. PATENT DOCUMENTS

| D. 292,932 | 11/1987 | McGinley | 434/272 X |
|---|---|---|---|
| 2,127,774 | 8/1938 | Jacobs | 434/273 |
| 2,284,888 | 6/1942 | Arneill, Jr. | 434/273 |
| 3,273,846 | 9/1966 | De Mare | 211/69.1 X |
| 4,001,952 | 1/1977 | Kleppinger | 434/262 |
| 4,789,340 | 12/1988 | Zikria | 434/272 |
| 5,061,187 | 10/1991 | Jerath | 434/273 |

FOREIGN PATENT DOCUMENTS

| 0756342 | 9/1956 | United Kingdom | 434/273 |
|---|---|---|---|
| 2206436 | 1/1989 | United Kingdom | 434/273 |

*Primary Examiner*—Gene Mancene
*Assistant Examiner*—Jeffrey A. Smith

[57] ABSTRACT

A demonstration model for a gynecological procedure, for example, LLETZ, comprising a platform hingedly supporting a transparent tubing simulating a woman's vaginal canal and sized to accommodate a standard speculum and to receive instruments to practice or demonstrate the procedures.

11 Claims, 3 Drawing Sheets

DEMONSTRATION MODEL FOR GYNECOLOGICAL PROCEDURE

This application is a continuation of application Ser. No. 07/817,046, filed Jan. 6, 1992, now abandoned.

This invention relates to a demonstration and teaching model for a gynecological procedure, and in particular to a model for demonstration of an electrosurgical gynecological procedure known as a large loop excision of the transformation zone (LLETZ).

BACKGROUND OF THE INVENTION

A relatively new gynecological procedure is known as LLETZ, and involves inserting an electrosurgical handpiece with a large loop electrode into a woman's vaginal canal to remove or excise from the cervix abnormal cells which may constitute dangerous precancerous lesions. Many physicians are unfamiliar with this procedure and need training. In addition, patient fears are often allayed when they are provided with a demonstration of the procedure that the physician has recommended. Thus, a need exists in the art for a device to train physicians and explain to a patient this gynecological procedure.

SUMMARY OF THE INVENTION

An object of the invention is a novel demonstration and teaching model that simulates the vaginal canal of a patient and that allows a physician to practice gynecological procedures.

Another object of the invention is a novel demonstration and teaching model that simulates the vaginal canal of a patient and that serves as an excellent educational model and teaching device for patients and health care auxiliaries.

According to one aspect of the invention, the teaching or demonstration model comprises a platform supporting a generally cylindrical tubing in such manner that a tissue specimen, for example, of meat, can be provided on the platform on top of a patient electrode plate of a commercially available electrosurgical apparatus, such as the Ellman SURGITRON F.F.P.F. electrosurgical machine. Preferably, the tubing is hinged to the platform to allow for easy insertion and removal of the tissue specimen.

According to another aspect of the invention, the tubing is sized to accommodate the conventional speculum used on patients to dilate the vaginal canal for access to the cervix. Preferably, the tubing is transparent so that the physician or patient can observe the tissue specimen during the simulated procedure. The meat specimen simulates the cervix. The physician can then insert the conventional electrosurgical handpiece with the appropriate electrode into the tubing, activate the machine, and practice or demonstrate removing thin surface slices of the meat specimen. A suction device attached to the speculum can be activated to remove unwanted smoke and odor.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

DETAILED DESCRIPTION OF THE PREFERRED EMBODIMENTS

As the incidence of cervical disease continues to rise, gynecologists need to place a premium on treatments that are rapid, safe, thorough, and cost effective. Laser vaporization and loop electrosurgical excising procedures are the treatment of choice for all CIN lesions. These procedures are relatively new and require teaching and laboratory practice. The invention provides a novel demonstration and teaching model for training the physician, as well as for explaining the procedure to a patient or health care auxiliaries.

Figure 2:
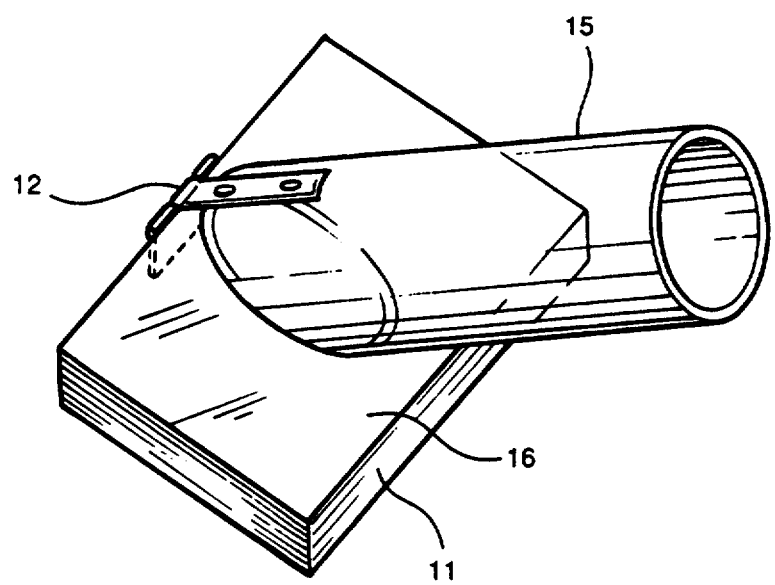
FIG. 2 is a perspective view of just the demonstration model of the invention alone.
Figure 3:
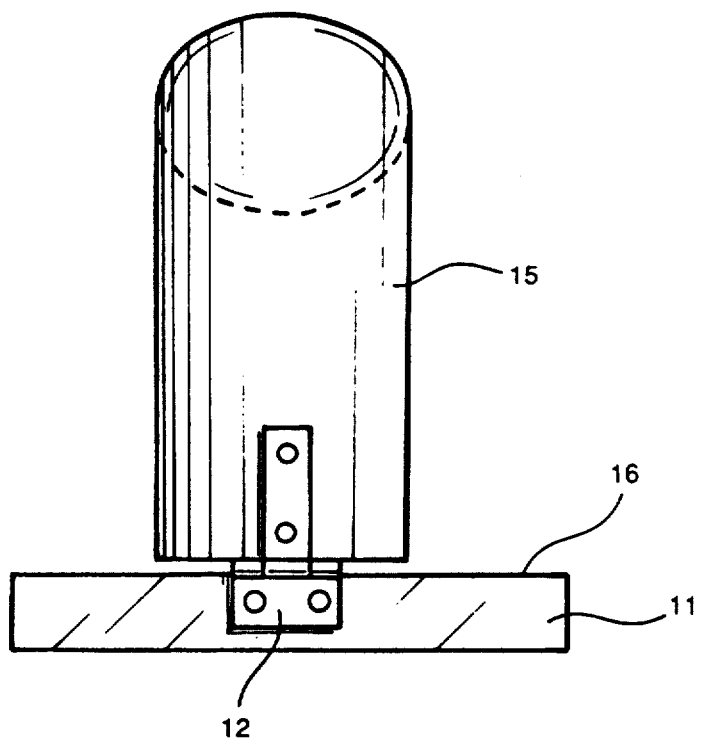
FIG. 3 is a rear view of the demonstration model of FIG. 2 showing the hinge construction.
Figure 5:
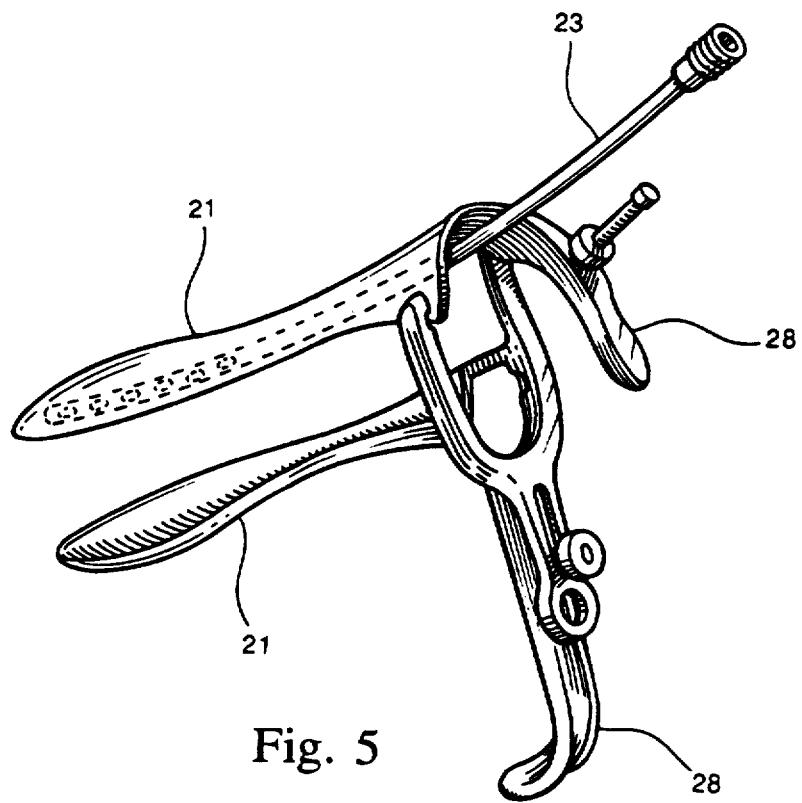
FIG. 5 is a perspective view of a conventional speculum.

A preferred embodiment of the teaching and demonstration model 10 of the invention comprises a stand or platform 11 made, for example, of plastic or metal. Hinged 12 at the rear of the platform 11 is a transparent tubing 15. In the assembled position shown in FIGS. 1 and 2, the tubing 15 extends at an acute angle of about 45°, preferably between 25° and 65°, to the platform top surface 16. Any convenient hinge mounting 12, as illustrated for example in FIG. 3, can be used. Preferably the tubing 15 is about 2-3 inches in diameter and about 4-5 inches in length. Preferably, the tubing is of transparent plastic, but it can also be of metal or opaque plastic. The tubing is sized to accommodate a standard speculum 20 as illustrated in FIG. 5, which comprises opposed dilating members 21 provided with suction ports 22 connected to suction tube 23. The latter is connected to tubing 24 connected by way of a conventional viral filter 25 to a suction device (not shown), such as that known as VAPOR-VAC, manufactured by the Ellman Company. The speculum 20 is supported on conventional adjustable supports 28, which may rest on a table or desk, and as shown extends within the tubing 15.

Figure 1:
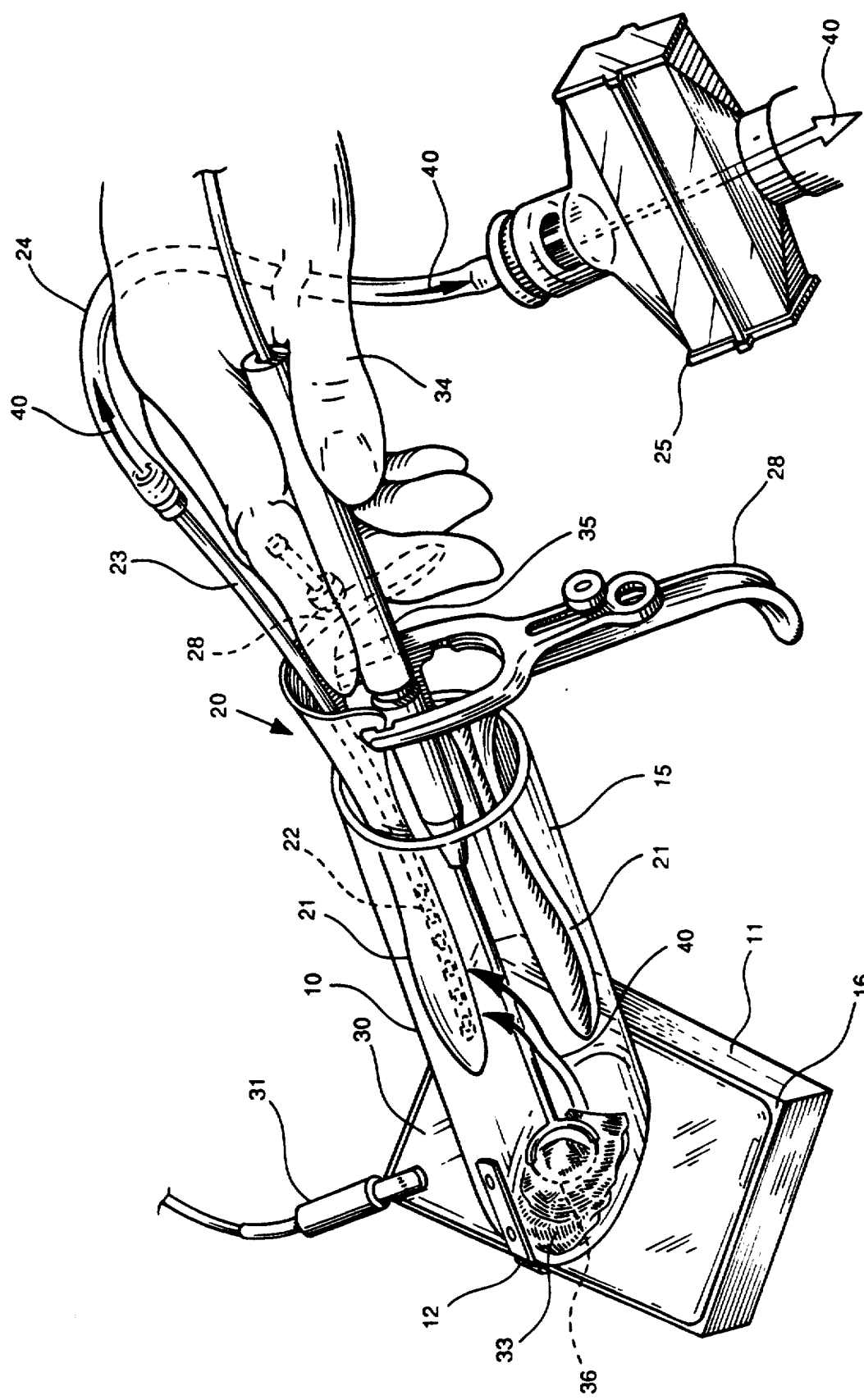
FIG. 1 is a perspective view of the demonstration model according to the invention as used during a practice or teaching session.

Mounted on the platform surface 16 is an electrosurgical patient electrode plate 30, connected by way of a connector 31 to the ground terminal of a conventional electrosurgical machine (not shown). On the patient plate 30 sits a meat specimen 33, for example, of beef, simulating the cervix. FIG. 1 also shows the hand 34 of the physician holding a conventional electrosurgical handpiece having at its working end a large loop electrode 36.

Figure 4:
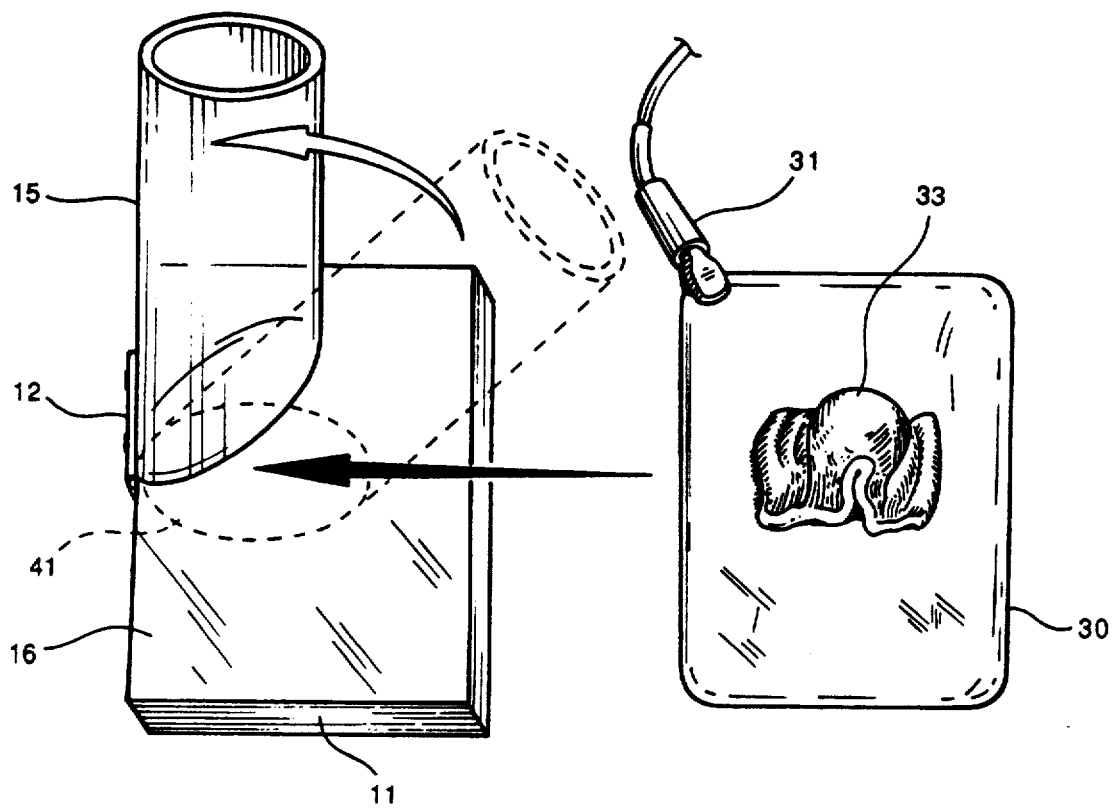
FIG. 4 is a perspective view illustrating insertion of the meat specimen in the demonstration model of FIG. 2.

FIG. 4 shows the tubing 15 tilted backwards on the hinge 12 to expose a specimen area 41 of the surface 16 of the platform 11, and the patient plate 30 with meat specimen 33 seated thereon in the process of being placed on the specimen area of the platform 11. Next, the tubing 15 is restored to the position shown in FIG. 1, and the speculum 20 mounted in position as shown in FIG. 1. The platform 11 must be large enough to hold the weight of the thick tubing 15 and inserted speculum 20. The speculum's thin tube 23 can then be connected as shown to a suction or vacuum device.

The physician can then practice, or demonstrate to a patient, insertion of the handpiece 35 with electrode 36 into the tubing 15 which simulates the vaginal canal. The meat specimen 33 serves as the cervix and practice can begin. When actual cutting is wanted, the electrosurgical instrument can be energized along with the vacuum device. While the cutting is practiced, the vacuum will remove unwanted smoke and odor illustrated by the arrows 40. In addition to serving as a demonstration model for the gynecologist or family physician, it also serves as an excellent patient teaching model and teaching device for health care auxiliaries.

Preferably, the platform 11 and tubing 15 are both made of Lucite plastic so that the cutting action of the electrode on the specimen can readily be observed by one or more persons.

While the invention has been described in connection with LLETZ practiced with electrosurgical or electrocautery machines, the demonstration model can also be used for demonstrations of other treatments involving the vaginal canal or cervix of a patient, such as laser cutting.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A demonstration model for a gynecological procedure comprising:
    a platform having a surface,
    an elongated tubing simulating the vaginal canal, said tubing having first and second, opposed, open ends,
    hinge means for mounting the tubing on the platform such that the tubing is pivotable about the hinge means between a first position wherein the tubing first open end is adjacent and encloses a specimen-receiving area on the platform surface and a second position wherein the tubing first open end is spaced from the specimen-receiving area permitting access to the specimen area.

2. The demonstration model of claim 1, wherein the hinge means is connected at a rear portion of the platform.

3. The demonstration model of claim 2, wherein the tubing is transparent.

4. The demonstration model of claim 3, wherein the tubing is sized to accommodate a speculum.

5. The demonstration model of claim 4, wherein the tubing extends at an angle between about 25° and 65° to the platform surface.

6. A demonstration model for a gynecological procedure as claimed in claim 1, wherein said tubing has a diameter of about 2-3 inches and a length of about 4-5 inches.

7. A demonstration model for a gynecological procedure comprising:
    a platform having a surface,
    an elongated tubing simulating the vaginal canal,
    means for mounting the tubing on the platform such that the tubing is movable between a first position enclosing a specimen-receiving area on the platform surface and a second position permitting access to the specimen-receiving area,
    in combination with a speculum mounted inside the tubing from an end remote from the platform, and
    an electrode supporting a tissue specimen on the platform surface with the tubing in its first position enclosing the specimen.

8. The combination of claim 7, wherein the mounting means comprises a hinge.

9. The combination of claim 8, wherein the tubing is transparent.

10. The combination of claim 7, wherein the tubing has a diameter of about 2-3 inches and a length of about 4-5 inches, and the tubing extends at an angle between about 25° and 65° to the platform surface.

11. A demonstration model for a gynecological procedure comprising:
    a platform having a surface,
    an elongated tubing having a central axis and simulating the vaginal canal, said tubing having first and second opposed ends, said first end being angled with respect to the said central axis,
    hinge means for mounting the tubing on the platform such that the tubing is pivotable about the hinge means between a first position wherein the tubing first end is adjacent and encloses a specimen-receiving area on the platform surface and a second position wherein the tubing first end is spaced from the specimen-receiving area permitting access to the specimen area, when in the first position said angled first end being parallel to the specimen-receiving area such that the tubing is angled at an angle between about 25° and 65° with respect to the specimen-receiving area.

* * * * *